(12) United States Patent
Chien et al.

(10) Patent No.: US 10,279,740 B1
(45) Date of Patent: May 7, 2019

(54) WARNING APPARATUS AND WARNING METHOD

(71) Applicant: HONGFUJIN PRECISION ELECTRONICS (TIANJIN) CO.,LTD., Tianjin (CN)

(72) Inventors: Yu-Ching Chien, New Taipei (TW); Chuang-Wei Tseng, New Taipei (TW)

(73) Assignee: HONGFUJIN PRECISION ELECTRONICS(TIANJIN)CO.,LTD., Tianjin (CN)

( * ) Notice: Subject to any disclaimer, the term of this patent is extended or adjusted under 35 U.S.C. 154(b) by 0 days.

(21) Appl. No.: 16/045,485

(22) Filed: Jul. 25, 2018

(30) Foreign Application Priority Data

Jun. 21, 2018 (CN) .......................... 2018 1 0644655

(51) Int. Cl.
*B60Q 7/00* (2006.01)
*G09F 7/00* (2006.01)
*G09F 21/00* (2006.01)
*G09F 13/00* (2006.01)

(52) U.S. Cl.
CPC ................. *B60Q 7/00* (2013.01); *G09F 7/00* (2013.01); *G09F 13/00* (2013.01); *G09F 21/00* (2013.01); *G09F 2007/005* (2013.01)

(58) Field of Classification Search
None
See application file for complete search history.

(56) References Cited

U.S. PATENT DOCUMENTS

| 5,945,907 | A * | 8/1999 | Yaron | B60Q 9/007 340/435 |
| 7,049,980 | B1 * | 5/2006 | Chemelewski | B60Q 9/004 340/556 |
| 9,937,906 | B1 * | 4/2018 | Stell | B60T 7/22 |
| 2003/0150661 | A1 * | 8/2003 | Kataoka | B60Q 9/004 180/204 |
| 2009/0289813 | A1 * | 11/2009 | Kwiecinski | B60Q 9/006 340/932.2 |
| 2010/0289670 | A1 * | 11/2010 | Boehme | B60Q 9/004 340/932.2 |
| 2012/0050025 | A1 * | 3/2012 | Hoeffel | B60Q 9/007 340/435 |
| 2012/0062743 | A1 * | 3/2012 | Lynam | B60Q 9/005 348/148 |
| 2013/0200991 | A1 * | 8/2013 | Ricci | G08C 19/00 340/4.3 |
| 2013/0335553 | A1 * | 12/2013 | Heger | B62D 15/0285 348/118 |
| 2014/0204210 | A1 * | 7/2014 | Schneider | B60R 1/00 348/148 |
| 2015/0009062 | A1 * | 1/2015 | Herthan | E05B 83/16 342/70 |

(Continued)

*Primary Examiner* — Julie B Lieu
(74) *Attorney, Agent, or Firm* — ScienBiziP, P.C.

(57) ABSTRACT

A warning apparatus includes a processor and a memory. The processor is configured to detect whether there is an object in front of the warning apparatus, calculate, when there is an object detected in front of the warning apparatus, a distance between the object and the warning apparatus, determine whether the calculated distance is less than a safe distance, and control the warning apparatus, when the calculated distance is less than the safe distance, to output a first control signal to control warning equipment to output a first warning.

6 Claims, 5 Drawing Sheets

(56) References Cited

U.S. PATENT DOCUMENTS

| | | | |
|---|---|---|---|
| 2015/0232027 A1* | 8/2015 | Freitas | B60Q 9/008 340/435 |
| 2017/0021767 A1* | 1/2017 | Lu | B62D 15/027 |
| 2017/0043716 A1* | 2/2017 | Hoepner | G08G 1/166 |
| 2017/0108873 A1* | 4/2017 | Tanaka | B60W 30/18009 |

* cited by examiner

WARNING APPARATUS AND WARNING METHOD

FIELD

The subject matter herein generally relates to vehicles, and more particularly to a warning apparatus implementing a warning method.

BACKGROUND

Generally, when a vehicle has an accident or becomes immobile, a driver of the vehicle is required to place a warning apparatus behind the vehicle to warn other drivers to slow down to avoid collision.

BRIEF DESCRIPTION OF THE DRAWINGS

Implementations of the present disclosure will now be described, by way of example only, with reference to the attached figures.

DETAILED DESCRIPTION

Figure 1:
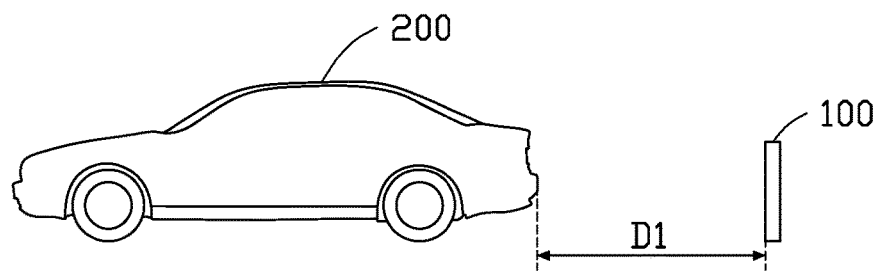
FIG. 1 is a diagram of a car and a warning apparatus in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
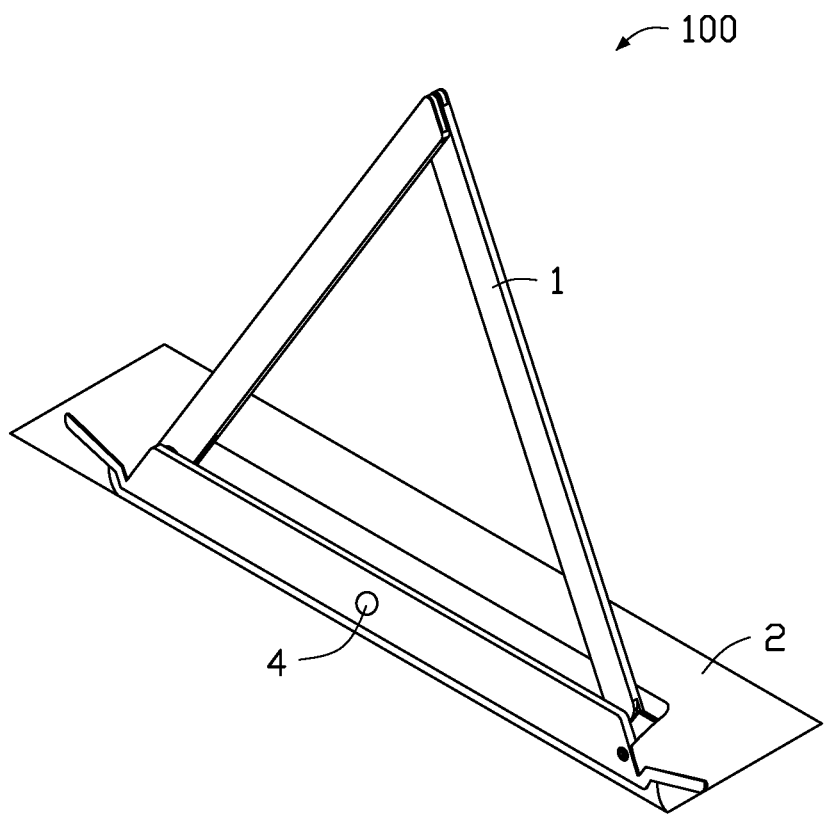
FIG. 2 is an isometric view of the warning apparatus of FIG. 1.
Figure 3:
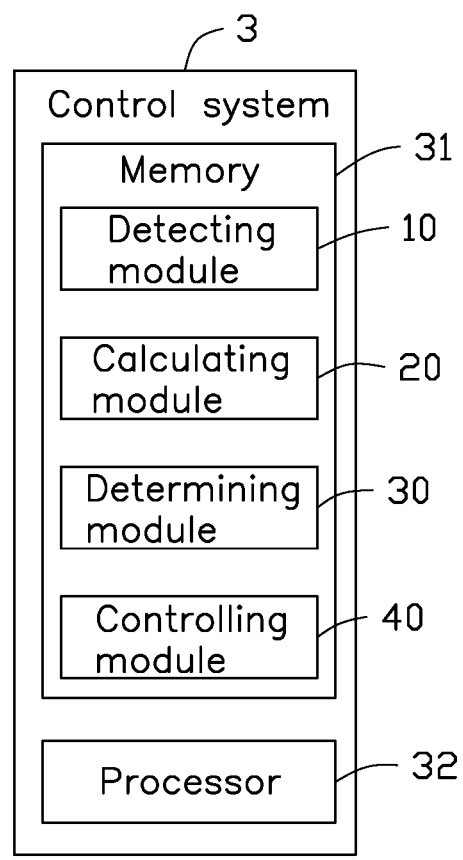
FIG. 3 is a block diagram of a control system of the warning apparatus.

FIGS. 1-3 illustrate an embodiment of a warning apparatus 100 including a warning sign 1, a base 2, and a control system 3. The warning apparatus 100 is used when a car 200 has an accident or becomess immobile on a street. The warning apparatus 100 is placed at a distance D1 behind the car 200. The distance D1 may be 50-100 meters or 150 meters. Warning equipment 300 outputs a warning signal when there is another car within a safe distance in front of the warning apparatus 100. The warning signal may include sound, lights, vibration, or other alarming signal.

In at least one embodiment, the warning equipment 300 includes a first warning unit arranged on the warning apparatus 100, and a second warning unit arranged on the car 200 or a mobile device carried by a driver of the car 200. The warning apparatus 100 may be a stationary object. When the car 200 has an accident or becomes immobile, the warning apparatus 100 is placed at the distance D1 behind the car 200 to warn other drivers of the accident or becomes immobile. For example, the warning apparatus 100 is placed 150 meters behind the car 200.

The control system 3 is implemented in the warning apparatus 100. The control system 3 includes a memory 31 and a processor 32. The memory 31 stores a plurality of instructions of a plurality of modules executed by the processor 32 to implement functions of the control system 3.

Referring to FIG. 3, in at least one embodiment, the modules include a detecting module 10, a calculating module 20, a determining module 30, and a controlling module 40.

The detecting module 10 detects whether there is an object in front of the warning apparatus 100.

In at least one embodiment, the warning apparatus 100 further includes detecting equipment 4. The detecting equipment 4 may be an infrared sensor, an ultrasonic sensor, or an image sensor. The detecting module 10 receives sensing information from the detecting equipment 4 to determine whether there is an object in front of the warning apparatus 100.

The calculating module 20 calculates a distance between the object and the warning apparatus 100 when the object is detected to be in front of the warning apparatus 100.

The determining module 30 determines whether the calculated distance is less than a safe distance.

In at least one embodiment, the safe distance is preset according to environmental factors. For example, when the car 200 has an accident or becomes immobile on an emergency lane of a highway, the safe distance is set as 20 meters. When the car 200 has an accident or becomes immobile on a less trafficked road, the safe distance is set as 10 meters.

The controlling module 40 controls the warning apparatus 100 to output a first warning signal when the calculated distance is less than the safe distance. The first warning signal controls the warning equipment 300 to output a first warning. The first warning may be an audio warning.

In at least one embodiment, the detecting module 10 further detects whether the warning apparatus 100 has been impacted. When the warning apparatus 100 has been impacted, the controlling module 40 controls the warning apparatus 100 to output a second control signal, which causes the warning equipment 300 to output a second warning. The warning apparatus 100 may include a G-sensor (not shown). The detecting module 10 receives data from the G-sensor to detect whether the warning apparatus 100 has been impacted. The second warning may be an audio warning louder than the first warning and a warning light.

In at least one embodiment, when the object in front of the warning apparatus 100 is not a car, such as a person or other object, the warning equipment 300 does not output the warning. The detecting equipment 4 can further include a camera unit (not shown). The detecting module 10 obtains image information when the detecting module 10 detects an object in front of the warning apparatus 100. The determining module 30 determines whether the object is a car according to the image information. When the determining module 30 determines that the object is a car, the calculating module 20 calculates the distance between the warning apparatus 100 and the car to determine whether the distance between the car and the warning apparatus 100 is less than the safe distance. When the determining module 30 determines that the object is not a car, the calculating module 20 does not calculate the distance of the object, and the warning equipment 300 does not output the warning.

For example, the warning equipment 300 includes the first warning unit on the warning apparatus 100 and the second warning unit on the car 200. When the detecting module 10 detects that the object in front of the warning apparatus 100 is a car, the calculating module 20 calculates the distance between the car and the warning apparatus 100, and the determining module 30 determines whether the calculated distance is less than the safe distance. When the calculating module 20 calculates that the distance is less than the safe distance, the first warning unit on the warning apparatus 100 and the second warning unit on the car 200 both output the first warning sign to alert other people in a vicinity of the car 200. When the detecting module 10 detects that the warning apparatus 100 has been impacted, such as when a car fails to brake in time and hits the warning apparatus 100, the first warning unit on the warning apparatus 100 and the second warning unit on the car 200 both output the second warning to further alert people in the vicinity of the car 200.

Figure 4:
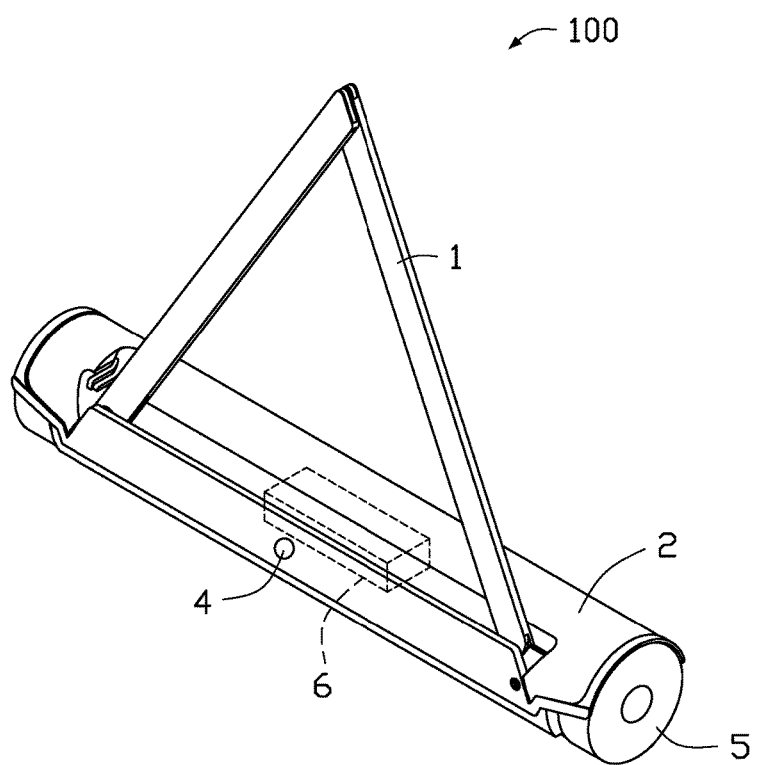
FIG. 4 is an isometric view of another embodiment of the warning apparatus of FIG. 1.

FIG. 4 illustrates another embodiment of the warning apparatus 100. The warning apparatus 100 can be a movable object and include at least two wheels 5 and a motor 6 under the base 2. The control system 3 can control the motor 6 to drive the wheels 5 to drive the warning apparatus 100. When the car 200 has an accident or becomes immobile, the warning apparatus 100 can drive itself to the distance D1 behind the car 200, such as 150 meters behind the car 200.

Figure 5:
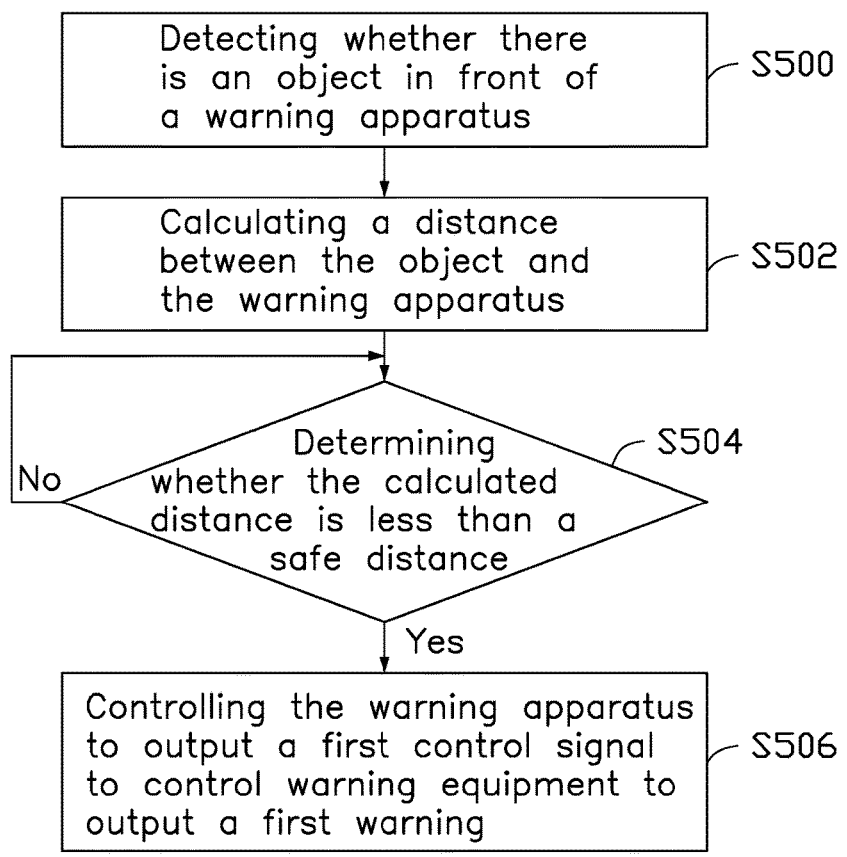
FIG. 5 is a flowchart diagram of implementing a warning method.

FIG. 5 illustrates a flowchart of an exemplary warning method implemented in a warning apparatus. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S500.

At block S500, the detecting module 10 detects whether there is an object in front of the warning apparatus 100.

At block S502, when there is an objected detected in front of the warning apparatus 100, the calculating module 20 calculates a distance between the object and the warning apparatus 100.

At block S504, the determining module 30 determines whether the calculated distance is less than a safe distance.

At block S506, when the calculated distance is less than the safe distance, the controlling module 40 controls the warning apparatus 100 to output a first control signal to control the warning equipment 300 to output the first warning.

The method above provides a warning method for preventing further collision when a car has an accident or becomes immobile.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A warning method implemented in a warning apparatus, the method comprising:
   detecting, by the warning apparatus, whether there is an object in front of the warning apparatus;
   calculating, when there is an object detected in front of the warning apparatus, a distance between the object and the warning apparatus;
   determining whether the calculated distance is less than a safe distance;
   controlling the warning apparatus, when the calculated distance is less than the safe distance, to output a first control signal to control warning equipment to output a first warning;
   detecting whether the warning apparatus has been impacted; and
   controlling the warning apparatus, when the warning apparatus has been detected to have been impacted, to output a second control signal to control the warning equipment to output a second warning; wherein:
   before detecting whether there is an object in front of the warning apparatus, the warning apparatus is placed at a predetermined distance behind a car.

2. The warning method of claim 1, wherein after whether there is an object in front of the warning apparatus is detected, further comprising:
   obtaining, when an object is detected in front of the warning apparatus, image information of the object;
   determining, according to the image information, whether the object is a car, and calculating, when the object is determined to be a car, a distance between the object and the warning apparatus.

3. The warning method of claim 2, wherein when the object is determined to not be a car, the distance between the object and the warning apparatus is not calculated.

4. A warning apparatus comprising:
   a processor;
   a memory configured to store a plurality of instructions, which when executed by the processor, cause the processor to:
   detect whether there is an object in front of the warning apparatus;
   calculate, when there is an object detected in front of the warning apparatus, a distance between the object and the warning apparatus;
   determine whether the calculated distance is less than a safe distance;
   control the warning apparatus, when the calculated distance is less than the safe distance, to output a first control signal to control warning equipment to output a first warning;

detect whether the warning apparatus has been impacted; and control the warning apparatus, when the warning apparatus has been detected to have been impacted, to output a second control signal to control the warning equipment to output a second warning; wherein before detecting whether there is an object in front of the warning apparatus, the warning apparatus is placed at a predetermined distance behind a car.

5. The warning apparatus of claim 4, wherein after whether there is an object in front of the warning apparatus is detected, the processor is further configured to:

obtain, when an object is detected in front of the warning apparatus, image information of the object;

determine, according to the image information, whether the object is a car, and calculate, when the object is determined to be a car, a distance between the object and the warning apparatus.

6. The warning apparatus of claim 5, wherein when the object is determined to not be a car, the distance between the object and the warning apparatus is not calculated.

\* \* \* \* \*